United States Patent [19]

Patterson et al.

[11] 4,115,726

[45] Sep. 19, 1978

[54] OPEN-LOOP ELECTRIC DRIVE WITH CORRECTIVE CONTROLLER

[75] Inventors: Marvin LeRoy Patterson, Ramona; Robert Dale Haselby, Escondido; Albert Prall Kendig, Ramona, all of Calif.

[73] Assignee: Hewlett-Packard Company, Palo Alto, Calif.

[21] Appl. No.: 756,679

[22] Filed: Jan. 4, 1977

[51] Int. Cl.² .............................................. H02P 5/40
[52] U.S. Cl. ..................................... 318/171; 318/189
[58] Field of Search ............... 318/189, 171, 696, 138, 318/254, 227

[56] References Cited

U.S. PATENT DOCUMENTS 3,908,158 9/1975 Studtmann ........................... 318/171

Primary Examiner—Herman J. Hohauser
Attorney, Agent, or Firm—Robert S. Hulse

[57] ABSTRACT

A controller minimizes periodic torque or force perturbations in an inductor-type synchronous motor drive by supplying current waveforms to each motor phase that contain a fundamental frequency component and selected harmonic components. The harmonic components in the phase currents heterodyne with the periodic permanent magnet flux fundamental frequency to create periodic torques or forces which subtract from the unwanted torques or forces perturbing the moving portion of the motor. The controller, which includes an interpolator, a memory, and a converter, provides for smooth incremental movement of a member such as a plot head, at substantially constant velocity, by applying selected continuous periodic waveform signals as phase currents to the windings of inductor-type synchronous motors.

11 Claims, 6 Drawing Figures

OPEN-LOOP ELECTRIC DRIVE WITH CORRECTIVE CONTROLLER

BACKGROUND OF THE INVENTION

Existing X-Y positioners generally fall into two categories: (a) closed-loop servomechanisms; and (b) open-loop incremental positioners. Incremental positioners include basic designs that utilize the incremental step size inherent to the motor and more sophisticated implementations that divide the motor step into smaller parts through a technique called microstepping.

Servo systems typically provide higher speed and greater precision but are, in general, more complicated and expensive to produce.

Open-loop incremental positioners use step motors to drive the mechanical linkage. The motors are given pulses of steps. An upper limit exists on the pulse rate that a given motor and load combination will follow and this ultimately limits the achievable performance of the controller. A large step size allows increased velocity at the cost of resolution. This speed/resolution trade-off is characteristic of incremental positioners.

Step motors are, however, significantly less sensitive to friction in the mechanical linkage than are servo motors. Furthermore, they accurately position their shaft without the use of a position feedback element. As a result, incremental controllers are typically simpler and much less expensive to produce than servo controllers.

Some incremental positioner designs are beginning to use microstepping techniques to get around the speed/resolution trade-off. Problems are encountered, however, whenever step motors are used at other than their inherent step positions. Both the static position accuracy and dynamic torque characteristics vary from nominal values in between the designed step positions. This causes perturbations to occur when the motor is moving that may interact with the mechanical resonances and degrade the smoothness of the motion.

These characteristics of the motor impair the performance of X-Y positioners. The motor imperfections most important to X-Y positioner performance are:

(a) non-linearities in torque null positioning; and, (b) non-uniformity in the torque slope. The first effect can obviously introduce errors in the position of the mechanics both while moving and at rest. More importantly, it adds harmonics of the phase current frequency to the rotor motion. In addition, friction can pull the rotor appreciably away from the null torque position during constant velocity motion. When this happens, a nonuniform torque slope creates periodic disturbances in the rotor dynamic equilibrium. These disturbances contain the phase current fundamental frequency and its harmonics.

At specific values of the phase current frequency, the fundamental and harmonic frequencies generated by these imperfections can interact with the resonance in the rotor response. For example, an eight-pole, four-phase motor having a resonance at $\omega_o$ may experience significant excitation of the rotor resonance when the sinusoidal phase currents have frequencies of $\omega_o$, $\omega_o/4$, $\omega_o/8$ and $\omega_o/2$.

SUMMARY OF THE INVENTION

Accordingly, the illustrated embodiment of the present invention comprises a synchronous inductor motor drive utilizing continuous phase current waveforms to eliminate the usual speed-resolution trade-off by allowing essentially continuous positioning of the motor shaft at substantially constant velocity. The variation of motor characteristics encountered in microstepping techniques is diminished by using phase current waveforms that are corrected for a given motor type and operating current level. The phase current waveforms are precompensated by the addition of a harmonic of the fundamental frequency. The harmonic linearizes the position accuracy and torque characteristics by heterodyning with the periodic permanent magnet flux fundamental frequency to diminish harmonic perturbations in the motor torque. Furthermore, adjustment is provided for the phase current dc levels and amplitude to allow further improvement in torque and position characteristics. In addition to diminishing torque perturbations of rotational motors, the present invention also provides for diminishing force perturbations of linear motors and for accurate positioning, at substantially constant velocity, utilizing linear as well as rotational inductor-type synchronous motors.

DESCRIPTION OF THE PREFERRED EMBODIMENT

Figure 1:
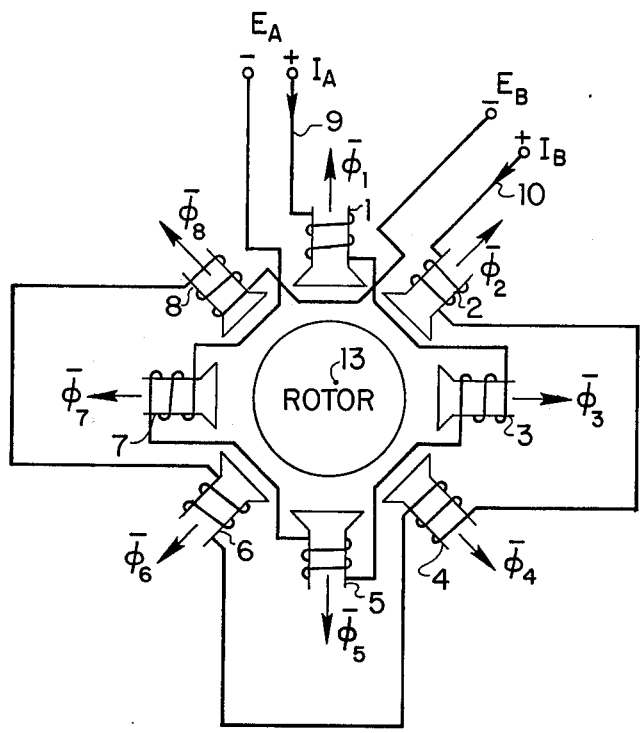
FIG. 1 is a diagrammatic illustration of an eight-pole, four-phase permanent magnet synchronous induction step motor having the poles coupled in a two-phase manner as utilized in the system of the present invention.

Referring to FIG. 1, an eight-pole, four-phase permanent magnet step motor is illustrated with alternate phases in series. Parallel connection of alternate phases can also be used. The rotor 11 is a bipolar permanent magnet which rotates about an axis 13 and has an instantaneous angular position of $\theta$. The stator poles 1 through 8 are electro-magnetically coupled in a two-phase manner with stator windings 9 and 10. Alternate poles 1, 3, 5 and 7 are coupled to stator winding 9 such that poles 1 and 5 have N clockwise windings and poles 3 and 7 have N counter-clockwise windings. Alternate poles 2, 4, 6 and 8 are coupled to stator winding 10 such that poles 2 and 4 have N clockwise windings and poles 6 and 8 have N counter-clockwise windings. A permanent magnet flux $\bar{\phi}i$ links the $i^{th}$ stator pole winding and the rotor. Inductances $L_A$ and $L_B$ exist in stator windings 9 and 10 respectively and currents $I_A$ and $I_B$ are applied to stator windings 9 and 10 respectively.

The torque developed by a synchronous inductor motor can be found by equating the electrical power applied at the stator windings to the sum of that flowing into storage mechanisms and that delivered to a load by the motor shaft. Energy dissipated in the motor through copper, eddy-current, or hysteresis losses is assumed to be negligible. The two electrical phases of the motor are assumed to act independently of each other in applying torque to the motor. The torque (T) can thus be separated into A and B phase components such that $$T_A = NI_A \frac{d}{d\theta}[-\bar{\phi}_1 + \bar{\phi}_3 - \bar{\phi}_5 + \bar{\phi}_7] - \frac{1}{2} I_A^2 \frac{DL_A}{d\theta} \quad (1)$$

and $$T_B = NI_B \frac{d}{d\theta}[-\bar{\phi}_2 + \bar{\phi}_4 - \bar{\phi}_6 + \bar{\phi}_8] - \frac{1}{2} I_B^2 \frac{dL_B}{d\theta} \quad (2)$$

The equations above indicate that torque arises from two mechanisms. First, the mmf (magnetomotive force) produced by the applied current interacts with the permanent magnet flux in the stator windings to produce torque. Secondly, torque is produced when the applied current interacts with a changing inductance. The permanent magnet synchronous motors discussed here, however, have very efficient flux paths linking the permanent magnet to the stator windings. Furthermore, measurements show that the inductance of each phase is very nearly independent of shaft position so that $dL/d\theta$ is very nearly zero. Consequently the first term produces the dominant torque for these motors and the second term is negligible.

Neglecting the variable reluctance contribution gives the A phase torque from equation (1) as $$T_A = NI_A \frac{d}{d\theta}[-\bar{\phi}_1 + \bar{\phi}_3 - \bar{\phi}_5 + \bar{\phi}_7] \quad (3)$$

Because of the motor construction the following relationships hold between the flux waveforms for the various stator windings $$\bar{\phi}_1 = \bar{\phi}_5 = \phi(\alpha) \quad (4)$$
$$\bar{\phi}_2 = \bar{\phi}_6 = \phi(\alpha - \frac{\pi}{2})$$
$$\bar{\phi}_3 = \bar{\phi}_7 = \phi(\alpha - \pi)$$
$$\bar{\phi}_4 = \bar{\phi}_8 = \phi(\alpha - \frac{3\pi}{2})$$

Where $\phi(\alpha)$ is some periodic waveform and $\alpha$ is related to the motor shaft position, $\theta$, by $$\alpha = Nr\theta \quad (5)$$

where $Nr$ equals the number of teeth on the rotor. For convenience a reference position is chosen so that, when $\alpha \& \theta = 0$, a tooth on the rotor is exactly aligned with the center of stator poles 1 and 5. This makes $\phi(\alpha)$ an even function symmetric about $\alpha = 0$.

The periodic flux waveform $\phi(\alpha)$ can be represented by an exponential Fourier series such that $$\phi(\alpha) = \sum_{n=-\infty}^{\infty} C_n \text{Exp}(jn\alpha) \quad (6)$$

$$\text{where } C_n = \frac{1}{2\pi} \int_{-\pi}^{\pi} \phi(\alpha) \text{Exp}(-jn\alpha) d\alpha \quad (7)$$

Since $\phi(\alpha)$ is even, all harmonic coefficients will be real-valued and symmetric about zero such that $$C_i = C_{-i} = \text{real number} \quad (8)$$

In general, the waveform of $\phi(\alpha)$ will contain a large fundamental and all harmonics. It will be determined by the permeance of the airgaps between the rotor and the stator poles.

From equations (4) and (6) the series for $\bar{\phi}_3(\alpha)$ and $\bar{\phi}_7(\alpha)$ is seen to be $$\bar{\phi}_3(\alpha) = \bar{\phi}_7(\alpha) = \phi(\alpha - \pi) = \sum_{n=-\infty}^{\infty} C_n \text{Exp}\{jn(\alpha - \pi)\}$$

which reduces to $$\bar{\phi}_3(\alpha) = \bar{\phi}_7(\alpha) = \sum_{n=-\infty}^{\infty} (-1)^n C_n \text{Exp}(jn\alpha) \quad (10)$$

Substituting equations (6) and (10) into (3) gives $$T_A = NI_A \frac{d}{d\theta} \sum_{n=-\infty}^{\infty} 2C_n\{-1 + (-1)^n\} \text{Exp}(jn\alpha) \quad (11)$$

Applying equation (5) and then taking derivatives yields $$T_A = NI_A Nr \sum_{n=-\infty}^{\infty} 2C_n(jn)\{-1 + (-1)^n\} \text{Exp}(jn\alpha) \quad (12)$$

All terms with even values of $n$ in the above summation are zero. This means that only odd harmonics of the flux waveform contribute to the torque when the effects of all four A phase stator poles are combined in the torque equation. The A phase torque can thus be expressed as $$T_A = -4 NI_A Nr \sum_{n=-\infty}^{\infty} j(2n + 1) C_{2n+1} \text{Exp}(j(2n + 1)\alpha) \quad (13)$$

A similar treatment using the relationships of equation (4) yields $$T_B = 4jNI_B Nr \sum_{n=-\infty}^{\infty} j(2n + 1)(-1)^n C_{2n+1} \text{Exp}(j(2n +1)\alpha) \quad (14)$$

Assume that the phase currents are sinusoidal such that $$I_A = I_P \cos\alpha_o = \frac{I_P}{2}(\text{Exp}(j\alpha_o) + \text{Exp}(-j\alpha_o)) \quad (15)$$

$$I_B = I_P \sin\alpha_o = \frac{-jI_P}{2}(\text{Exp}(j\alpha_o) + \text{Exp}(-j\alpha_o)) \quad (16)$$

Substituting these currents into equations (13) and (14) gives $$T_A = -2NI_P Nr(\text{Exp}(j\alpha_o) + \text{Exp}(-j\alpha_o)) \sum_{n=-\infty}^{\infty} j(2n + 1)C_{2n+1} \text{Exp}(j(2n + 1)\alpha) \quad (17)$$

$$T_B = +2NI_P Nr(\text{Exp}(j\alpha_o) - \text{Exp}(-j\alpha_o)) \sum_{n=-\infty}^{\infty} j(2n + 1)(-1)^n C_{2n+1} \text{Exp}(j(2n + 1)\alpha) \quad (18)$$

When the motor is being driven in its normal synchronous mode, the electrical and mechanical phases are related by $$\alpha_o(t) = \alpha(t) + \gamma(t) \qquad (19)$$

where $\gamma(t)$ is a lag angle that depends on the instantaneous rotor dynamics and load torque requirements. During constant velocity operation $\gamma(t)$ tends to be a constant, $\gamma$, and the phase current electrical angle is given by $$\alpha_o(t) = \omega_o t \qquad (20)$$

so that $$\alpha(t) = \omega_o t - \gamma \qquad (21)$$

The A phase torque produced under these conditions can be expressed by combining exponentials as $$T_A = -2NI_pNr[\sum_{n=-\infty}^{\infty} j(2n+1)C_{2n+1}\mathrm{Exp}(j\{(2n+1)(\omega_o t - \gamma) + \omega_o t\}) + \sum_{m=-\infty}^{\infty} j(2m+1)C_{2m+1}\mathrm{Exp}(j\{(2m+1)(\omega_o t - \gamma) - \omega_o t\})] \qquad (22)$$

or $$T_A = -2NI_pNr[\sum_{n=-\infty}^{\infty} j(2n+1)C_{2n+1}\mathrm{Exp}(-j(2n+1)\gamma)\mathrm{Exp}(j2(n+1)\omega_o t) + \sum_{m=-\infty}^{\infty} j(2m+1)C_{2m+1}\mathrm{Exp}(-j(2m+1)\gamma)\mathrm{Exp}(j2m\omega_o t)] \qquad (23)$$

Letting $n = m - 1$ allows the summations to be easily combined into $$T_A = -2NI_pNr \sum_{m=-\infty}^{\infty} \{j(2m-1)C_{2m-1}\mathrm{Exp}(-j(2m-1)\gamma) + j(2m+1)C_{2m+1}\mathrm{Exp}(-j(2m+1)\gamma)\}\mathrm{Exp}(j2m\omega_o t) \qquad (24)$$

This can be written more simply as $$T_A = -2NI_pNr \sum_{m=-\infty}^{\infty} A_{2m}\mathrm{Exp}(j2m\omega_o t) \qquad (25)$$

where $$A_{2m} = j(2m-1)C_{2m-1}\mathrm{Exp}(-j(2m-1)\gamma) + j(2m+1)C_{2m+1}\mathrm{Exp}(-j(2m+1)\gamma) \qquad (26)$$

The B phase torque with sinusoidal phase currents can be found similarly as $$T_B = -2NI_pNr \sum_{m=-\infty}^{\infty} B_{2m}\mathrm{Exp}(j2m\omega_o t) \qquad (27)$$

with $$B_{2m} = j(-1)^m\{(2m-1)C_{2m-1}\mathrm{Exp}(-j(2m-1)\gamma)) + (2m+1)C_{2m+1}\mathrm{Exp}(-j(2m+1)\gamma)\} \qquad (28)$$

A practical translation of equations (25) through (25) is that sinusoidal, steady state phase currents of frequency, $\omega_0$, heterodyne with the odd harmonic contained in the permanent magnet flux waveforms to produce torque at dc and all even harmonic frequencies. Furthermore, the amplitude of the torque at any even harmonic frequency depends not only on the input current amplitude but also on the amplitudes of flux harmonics on either side of the particular torque harmonic. For example, the torque produced at frequency $4\omega_o$ ($m=2$) depends on the amplitudes of the third and fifth flux harmonics. Finally, a dependency on $\gamma$ is seen in the expressions for $A_{2m}$ and $B_{2m}$.

The total motor shaft torque can now be obtained by adding equations (25) and (27). This gives $$T = -2NI_pNr \sum_{m=-\infty}^{\infty} (A_{2m} + B_{2m})\mathrm{Exp}(j2m\omega_o t) \qquad (29)$$

Comparing equations (26) and (28), however, reveals that $$B_{2m} = (-1)^m A_{2m} \qquad (30)$$

so that $$T = -2NI_pNr \sum_{m=-\infty}^{\infty} A_{2m}\{1 + (-1)^m\}\mathrm{Exp}(j2m\omega_o t) \qquad (31)$$

The term in brackets is zero whenever m is odd and two whenever m is even. This, in effect, eliminates torque at frequencies of $2\omega_o$, $6\omega_o$, $10\omega_o$, etc., and enhances the torque produced at dc, $4\omega_o$, $8\omega_o$, etc. The final expression for torque with sinusoidal phase currents can thus be written $$T = -4NI_pNr \sum_{n=-\infty}^{\infty} D_{4n}\mathrm{Exp}(j4n\omega_o t) \qquad (32)$$

where $$D_{4n} = j(4n-1)C_{4n-1}\mathrm{Exp}(-j(4n-1)\gamma) + j(4n+1)C_{4n+1}\mathrm{Exp}(-j(4n+1)\gamma) \qquad (33)$$

Factoring out common terms gives $$D_{4n} = j\mathrm{Exp}(-j4n\gamma)[(4n-1)C_{4n-1}\mathrm{Exp}(j\gamma) + (4n+1)C_{4n+1}\mathrm{Exp}(-j\gamma)] \qquad (34)$$

The existence of harmonic torque terms causes undesirable perturbations in the mechanical load attached to the motor shaft. In some applications these perturbations can be prohibitive. The previous results offer insight into the cause and characteristics of these harmonics and suggests ways in which they might be minimized.

Analysis of equation (34) for $n=1$ shows that the 4th harmonic torque, for instance, depends on the adjacent 3rd and 5th harmonics of the permanent magnet flux waveform. A way of minimizing the magnitude of the term is to inject 3rd harmonic current along with the original sinusoidal phase current. This additional current is added to the normal sinusoidal A and B currents so the $$I_B(\alpha_o) = I_A[\alpha_o - \pi/2]$$

In other words, the B phase current waveform must be identical to that of the A phase but shifted by one-fourth of a period. The level of 3rd harmonic can be adjusted to optimize the correction for different motors or different load conditions.

In effect, the added 3rd harmonic current heterodynes, or beats, with the permanent magnet flux fundamental to create 4th and 2nd harmonic torque in each phase of the motor. As before, the quadrature arrangement of the two phases causes the additional 2nd harmonic torque to cancel and enhances the new 4th harmonic term. If the amplitude and phase of the 3rd harmonic current is properly adjusted, the 4th harmonic torque thus created will effectively cancel that generated by the fundamental phase current.

The added 3rd harmonic current also beats with the higher odd harmonics present in the permanent magnet flux waveform and produces additional torque at dc and all other even harmonics. These terms are much lower in magnitude than the primary corrective term discussed above because of the difference in amplitude between the permanent magnet flux fundamental and its higher harmonics. Consequently, these torque components can be neglected without significant error.

If reduction of the 8th harmonic torque is desired, it can be achieved similarly by adding a 7th harmonic term to both phase currents. This term will beat with the permanent magnet flux fundamental to create 6th and 8th harmonic torque components. The 6th harmonic torque will again cancel because of the two quadrature phases and the 8th harmonic torque from the two phases will add. Proper adjustment of the 7th harmonic current amplitude and phase will minimize the resultant 8th harmonic torque. This argument can be repeated for the correction of higher frequency terms as necessary.

Similar results can be obtained by either: (1) using the current harmonic immediately above the troublesome torque harmonic or; (2) using a weighted sum of both the upper and lower current harmonics adjacent to the particular torque harmonic. The lower harmonic was assumed in the discussion above because: (1) a single harmonic is easier to implement and adjust, and (2) the lower current frequency develops less voltage across the phase winding inductance.

The 4th harmonic torque is usually the most troublesome and the added 3rd harmonic current seems to be the most effective method of correction. The results obtained here will thus cover the area of most direct interest as well as serve as a guideline to the analysis of other cases. This section presents a detailed analysis of the results produced by adding a 3rd harmonic term to the phase currents. Similar analyses can be made for the other cases discussed above, but for brevity, will not be included here.

Let the A phase current, $I_A$, be given by $$I_A = I_P \cos\alpha_o + I_3 \cos(3\alpha_o + \beta) \tag{36}$$

In accordance with equation (35), the B phase current will then be $$I_B = I_P \sin\alpha_o - I_3 \sin(3\alpha_o + \beta) \tag{37}$$

Applying Euler's identities gives $$I_A = \frac{I_P}{2}[\text{Exp}(j\alpha_o) + \text{Exp}(-j\alpha_o)] + \tag{38}$$

-continued
$$\frac{I_3}{2}[\text{Exp}(j(3\alpha_o + \beta)) + \text{Exp}(-j(3\alpha_o + \beta))]$$

and $$I_B = \frac{-jI_P}{2}[\text{Exp}(j\alpha_o) - \text{Exp}(-j\alpha_o)] + \tag{39}$$
$$\frac{jI_3}{2}[\text{Exp}(j(3\alpha_o + \beta)) + \text{Exp}(-j(3\alpha_o + \beta))]$$

Substituting equation (38) into equation (13) gives $$T_A = -2NN_rI_P[\{(\text{Exp}(j\alpha_o) + \text{Exp}(-j\alpha_o)\} + I_3\{\text{Exp}(j(3\alpha_o + \beta)) + \text{Exp}(-j(3\alpha_o + \beta))\}] \cdot \tag{40}$$
$$\sum_{n=-\infty}^{\infty} j(2n+1)C_{2n+1}\text{Exp}(j(2n+1)\alpha)$$

or $$T_A = \tilde{T}_A + \hat{T}_A \tag{41}$$

Where $\tilde{T}_A$ is the same as that given initially by equation (17) and ultimately by equations (25) and (26). $\hat{T}_A$ is the result of the 3rd harmonic current and is given by $$\hat{T}_A = -2NI_3N_r[\text{Exp}(j(3\alpha_o + \beta)) + \text{Exp}(-j(3\alpha_o + \beta))] \cdot \tag{42}$$
$$\sum_{n=-\infty}^{\infty} j(2n+1)C_{2n+1}\text{Exp}(j(2n+1)\alpha)$$

Neglecting all higher order terms in the summation gives $$\hat{T}_A = -2NI_3N_r[\text{Exp}(j(3\alpha_o + \beta)) + (\text{Exp}(-j(3\alpha_o + \beta))](jC_1\text{Exp}(j\alpha) - jC_{-1}\text{Exp}-(-j\alpha)) \tag{43}$$

Recognizing that $C_1 = C_{-1}$ and applying equations (20) and (21) gives the constant torque as $$\hat{T}_A = 2jNi_3N_rC_1[\{-\text{Exp}(j(2\omega_o t + \beta + \gamma)) + \text{Exp}(-j(2\omega_o t + \beta + \gamma))\} + \{\text{Exp}(j(4\omega_o t + \beta - \gamma)) - \text{Exp}(-j(4\omega_o t + \beta - \gamma))\}] \tag{44}$$

Euler's identities reduce this to $$\hat{T}_A = 4Ni_3N_rC_1[-\text{Sin}(2\omega_o t + \beta + \gamma) + \text{Sin}(4\omega_o t + \beta - \gamma)] \tag{45}$$

Turning now to the B phase, substitution of equation (39) into equation (14) gives $$T_B = 2NN_r[I_P\{\text{Exp}(j\alpha_o) - \text{Exp}(-j\alpha_o)\} - I_3\{\text{Exp}(j(3\alpha_o + \beta)) - \text{Exp}(j(3\alpha_o + \beta))\}] \cdot \tag{46}$$
$$\sum_{n=-\infty}^{\infty} j(-1)^n(2n+1)C_{2n+1}\text{Exp}(j(2n+1)\alpha)$$

or $$T_B = \tilde{T}_B + \hat{T}_B \tag{47}$$

where $\tilde{T}_B$ is the same as the torque due to purely sinusoidal phase current given by equations (27) and (28). $\hat{T}_B$ is the torque term resulting from the 3rd harmonic current and is given by $$\hat{T}_B = -2NI_3N_r[\text{Exp}(j(3\alpha_o + \beta)) - \text{Exp}(-j(3\alpha_o + \beta))] \tag{48}$$
$$\sum_{n=-\infty}^{\infty} j(-1)^n(2n+1)C_{2n+1}\text{Exp}(j(2n+1)\alpha)$$

Assuming that all higher order terms in the summation above are insignificant with respect to $C_1$ and $C_{-1}$ gives $$\hat{T}_B = -2NI_3Nr[\text{Exp}(j(3\alpha_o+\beta)) - \text{Exp}(-j(3\alpha_o+\beta))][j \cdot C_1\text{Exp}(j\alpha) + jC_{-1}\text{Exp}(-j\alpha)] \quad (49)$$

At constant velocity equations (20) and (21) apply to make $$\hat{T}_B = -2jNI_3NrC_1[\{\text{Exp}(j(2\omega_o t+\beta+\gamma)) - \text{Exp}(-j(2\omega_o t+\beta+\alpha))\} + \{\text{Exp}(j(4\omega_o t+\beta-\gamma)) - \text{Exp}(-j(4\omega_o t+\beta-\gamma))\}] \quad (50)$$

This reduces to $$\hat{T}_B = 4NI_3NrC_1[\sin(2\omega_o t+\beta+\gamma) + \sin(4\omega_o t+\beta-\gamma)] \quad (51)$$

The total torque generated by fundamental and 3rd harmonic currents is $$T = \hat{T}_A + \hat{T}_A + \hat{T}_B + \hat{T}_B = \hat{T} + \hat{T} \quad (52)$$

where $$\hat{T} = \hat{T}_A + \hat{T}_B \quad (53)$$

as seen by equations (32) and (33). $\hat{T}$ is found from equations (45) and (51) as $$\hat{T} = \hat{T}_A + \hat{T}_B = 8NI_3NrC_1\sin(4\omega_o t+\beta-\gamma) \quad (54)$$

The total torque, T, is thus exactly the same as that derived for sinusoidal phase currents except that a 4th harmonic term has been added, hopefully in a manner that reduces the overall magnitude of that torque component.

The 4th harmonic of $\tilde{T}$ as obtained from equations (32) and (33), with $n=+1$ and $-1$, is $$\tilde{T}_4 = -4NI_pNr(D_4\text{Exp}(j4\omega_o t)+D_{-4}\text{Exp}(-j4\omega_o t) \quad (55)$$

with $$D_4 = j(3C_3\text{Exp}(-j3\gamma)+5C_5\text{Exp}(-j5\gamma)) \quad (56)$$

$$D_{-4} = -j(3C_{-3}\text{Exp}(+j3\gamma)+5C_{-5}\text{Exp}(+j5\gamma)) \quad (57)$$

Since $C_i = C_{-i}$, this reduces to $$\tilde{T}_4 = 8NI_pNr(3C_3\sin(4\omega_o t-3\gamma)+5C_5\sin(4\omega_o t-5\gamma)) \quad (58)$$

For perfect cancellation of the 4th harmonic torque the sum of $\hat{T}$ and $\tilde{T}_4$ must be zero. This implies that $$I_3C_1\sin(4\omega_o t+\beta-\gamma) = -[3I_pC_3\sin(4\omega_o t-3\gamma)+5I_pC_5\sin(4\omega_o t-5\gamma)] \quad (59)$$

Figure 2:
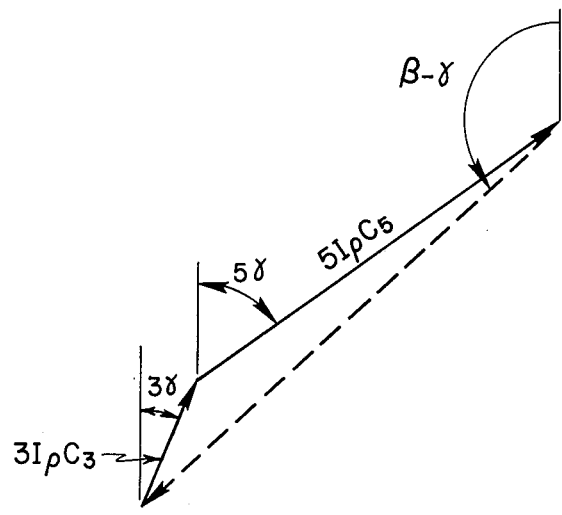
FIG. 2 is a phasor diagram illustrating the relationship of third and fourth harmonic torques for substantially perfect cancellation of fourth harmonic torque.

This equation is illustrated by the phasor diagram of FIG. 2.

Equation (59) and its corresponding phasor diagram show that in general, the amplitude and phase of the required 3rd harmonic correction current both vary as a function of the rotor lag angle, $\gamma$. This angle in turn depends on the speed related torque required by the load. Implementing a correction that remains perfect over a wide speed range would thus be extremely difficult.

Fortunately, however, correction of the 4th harmonic torque is usually critical only in a narrow range of motor speed. When the frequency of the 4th harmonic torque component falls within the bandwidth of the motor-load resonance, mechanical motion of the load is amplified. The critical speed range is thus usually fairly narrow and dependent on the damping factor of the motor-load response. Rotor lag angles are relatively low in this speed range. These two factors combine to greatly simplify the implementation of a practical correction waveform.

If the rotor lag angle were zero, FIG. 2 implies that the optimum value for $\beta$ would be $\pi$. Equation (59) would then reduce to $$I_3C_1 = 3I_pC_3 + 5I_pC_5 \quad (60)$$

Figure 3:
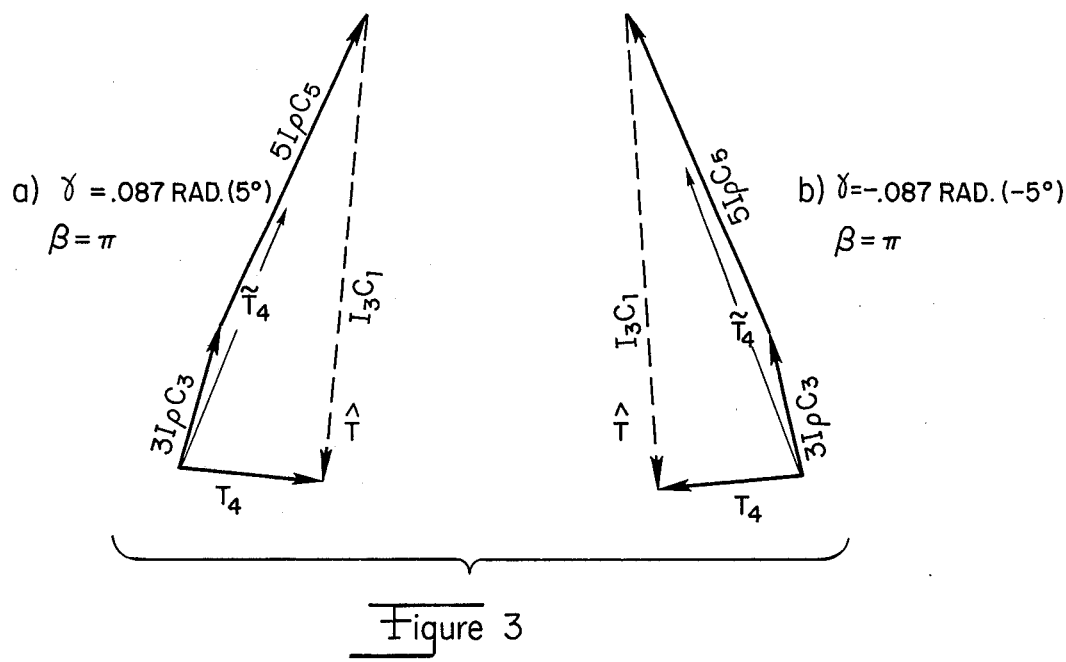
FIG. 3 is a phasor diagram illustrating a minimum magnitude reached by the fourth harmonic torque when the third and fourth harmonic torques are in quadrature.

This condition minimizes 4th harmonic perturbations under no-load conditions. As the lag angle magnitude increases from zero in a positive or negative direction the phasor diagram alters as shown in FIG. 3 to produce a finite but still greatly reduced 4th harmonic torque. The amplitude of the 3rd harmonic, $I_3$, must be reduced somewhat as $|\gamma|$ increases to maintain a minimum magnitude for $T_4$. This minimum occurs when $\hat{T}$ and the resultant torque, $T_4$, are in quadrature as shown in FIG. 3.

A practical implementation of this technique for small rotor lag angles is to produce phase currents of the form $$I_A = I_p\cos\alpha_o - I_3\cos 3\alpha_o \quad (61)$$

$$I_B = I_p\sin\alpha_o + I_3\sin 3\alpha_o \quad (62)$$

If the implementation is to be used with many motors having various harmonic characteristics, the value of $I_3$ should be made adjustable over a range of positive and negative values centered about zero. This is due to the fact that the amplitude of the 4th harmonic torque produced by various motors may vary and the sense may be either plus or minus, depending on the signs and relative magnitudes of $C_3$ and $C_5$.

Figure 4:
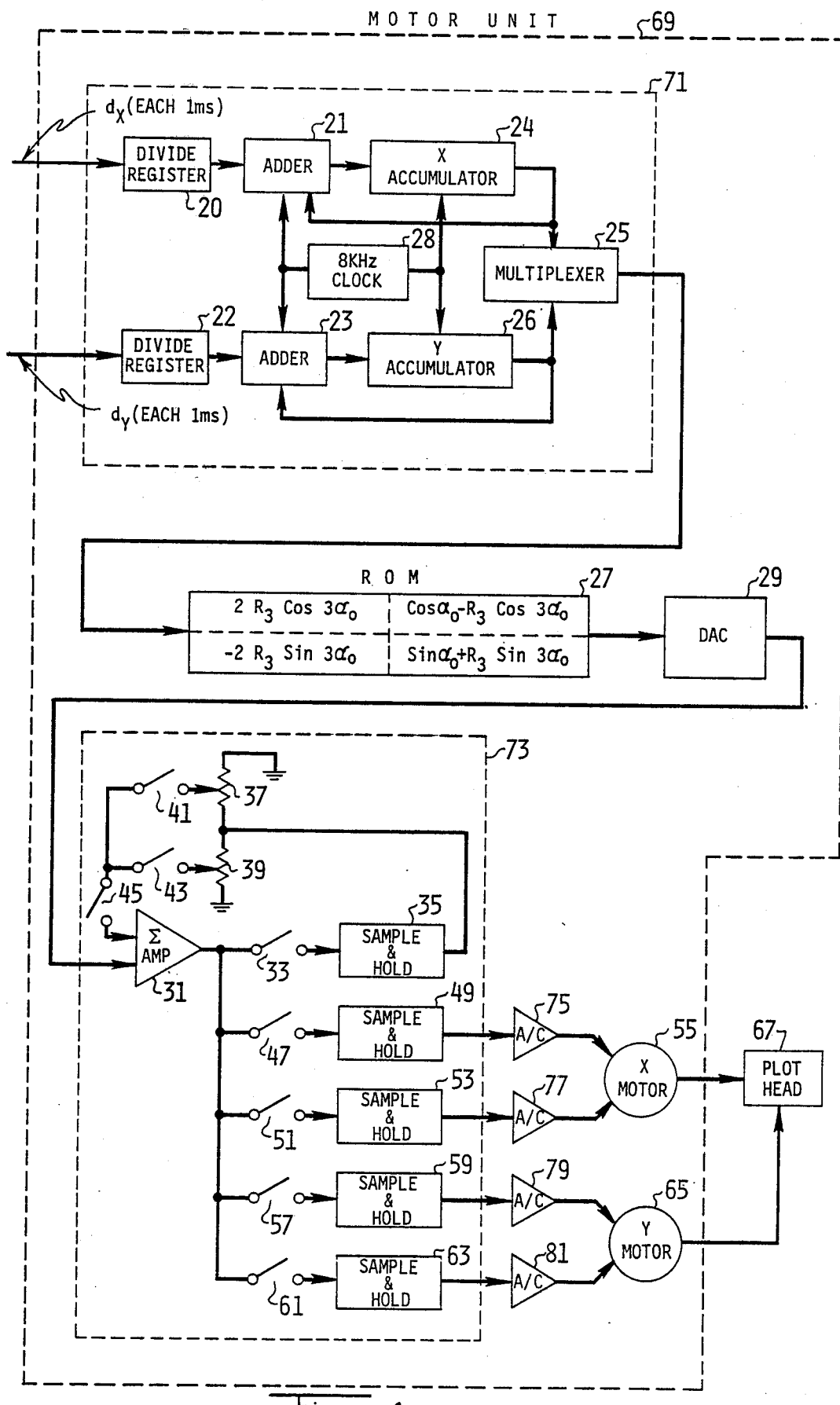
FIG. 4 is a combination block and schematic diagram of the system of the present invention.

A method for generating such waveforms for a two axis (X-Y coordinate) system is shown schematically in FIG. 4. This implementation provides independent adjustment of the 3rd harmonic correction current for each motor. In addition, it simultaneously varies the A and B phase waveforms for each motor with a single adjustment.

FIG. 4 shows a motor unit 69 comprising an interpolator 71, a function generator or read-only-memory (ROM) 27, digital to analog converter (DAC) 29, control circuit 73, phase current amplifiers 75, 77, 79, 81 and X and Y axis motors 55 and 65. Interpolator 71, in turn, includes divider registers 20, 22, adders 21, 23, 8-bit accumulator registers 24, 26, multiplexer 25 and 8KHz clock 28.

When X-position data is applied to motor unit 69, interpolator 71 converts the applied data to an address for accessing current waveform values stored in ROM 23, and for producing a sample of the accessed waveform. This sample is then applied to DAC 29 which converts the sample to an analog signal, and applies the analog signal, via control circuit 73 and phase current amplifiers 75, 77, to motor 55. In response to the applied analog signal, motor 55 rotates a selected angle causing plot head 67 to move, in the X direction, a distance proportional to the applied X position data. Similarly, Y position data applied to motor unit 69 causes plot head 67 to move, in the Y direction, a distance proportional to the applied Y position data.

Figure 5:
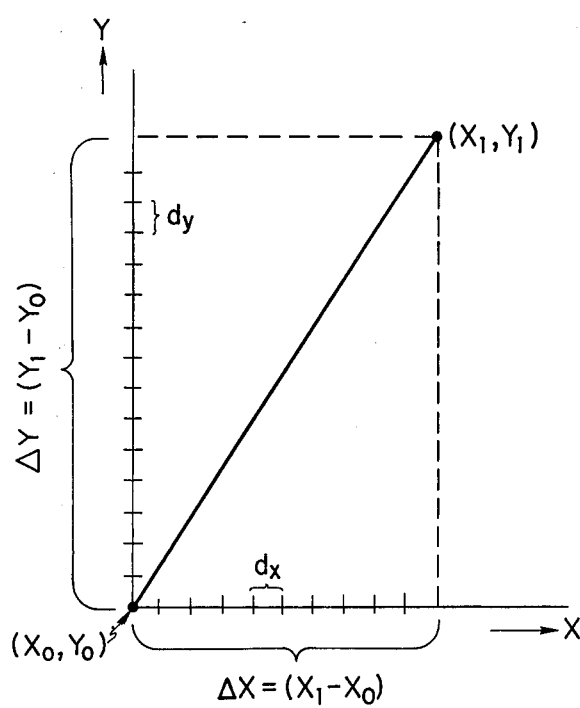
FIG. 5 is a waveform diagram depicting the X-Y components of incremental moves made by the system of FIG. 4.

As shown in FIG. 4, X and Y position data, in the form of incremental distance values $d_x$ and $d_y$, are applied to divider registers 20, 22 respectively. These incremental values represent distances along the X and Y coordinate axes that plot head 67 must travel during a selected time period (e.g., during a one millisecond period, corresponding to a 1KHz clock signal). Since these values ($d_x$ and $d_y$) indicate distances to be travelled over a period of time, they present velocity values, viz., velocities at which plot head 67 must travel along the X and Y coordinate axes, respectively. These applied incremental values, $d_x$ and $d_y$, may be variable, and may be determined, for example, as follows:

$$d_x = \Delta X/C$$

$$d_y = \Delta Y/C$$

where, $\Delta X$ represents the X component of the vector defined by successive input data pairs ($X_0$, $Y_0$) and ($X_1$, $Y_1$) as shown in FIG. 5, $\Delta Y$ represents the Y component of said vector, and C represents an integer equal to the number of one millisecond clock periods into which the data period (i.e., the time or period between successive input data pairs, in milliseconds) may be divided.

Returning now to FIG. 4, incremental distance values $d_x$ and $d_y$ are applied to divider registers 20, 22, respectively, of interpolator 71. Interpolator 71, as mentioned above, utilizes these incremental distance values to produce ROM addresses for accessing selected locations (words) of ROM 27. ROM 27 contains four sectors (series) of digital values. These digital values are samples of selected analog waveforms representing one period of a fundamental frquency waveform and three periods of a third harmonic waveform. The four ROM sectors include, as a series of digital values, one period of the fundamental and three periods of third harmonic data, as follows: (1) the A phase third harmonic ($2R_3\cos 3\alpha_0$), (2) a phase fundamental plus third harmonic ($\cos\alpha_0 - R_3\cos 3\alpha_0$), (3) B phase third harmonic ($-2R_3\sin 3\alpha_0$), and (4) B phase fundamental plus third harmonic ($\sin\alpha_0 + R_3\sin 3\alpha_0$). The digital values are stored in two groups of 128 words each, each word containing 16 bits. A first group of words contains A-phase waveform data (explained hereinafter) to be applied to motors 55, 65, and the second group of words contains B-phase waveform data (explained hereinafter) to be applied to motors 55, 65. Of the first group of words of ROM 27, the most significant (leading) eight bits contain A-phase third harmonic data, and the least significant eight bits contain A-phase fundamental plus third harmonic data. Likewise, the most and least significant eight bits of the second group of ROm words contain B-phase third harmonic and B-phase fundamental plus third harmonic data. Thus, within each group, a single address permits the accessing of A-phase and B-phase current waveform data for application to a motor.

Interpolator 71, as shown in FIG. 4, utilizes the applied incremental distance values $d_x$ and $d_y$ to produce ROM addresses. The ROM addresses are, in turn, used to cycle-through ROM 27 (i.e., to progressively access the addressed words of ROM 27 in accordance with accepted sampling theory), and to advance motors 55, 65 and plot head 67.

To recreate a waveform, sampling theory dictates that at least two samples of the highest frequency contained in the waveform are required. Since ROm 27 contains one cycle of the fundamental and three cycles of the third harmonic component, at least six samples must be accessed every addressing cycle through the ROM. This means that the largest advance or increment allowable between selected ROM addresses (i.e., the increment from one ROM-address-advance to the next) should be one-sixth or less of a full-scale advance, a full-scale advance being equivalent to an advance of one cycle or period through ROM 27. (For example, a full-scale, one-cycle advance would cause plot heat 67 to move linearly 0.04 inches, where 50 cycles produces one revolution of motor 55, or of motor 65, equivalent to a linear movement of 2 inches.) If the input values of $d_x$ and $d_y$ were simply added (by their respective adders 21, 23) to their respective accumulators 24, 26 in a single step, excessively large address values may be produced that would cause the ROM-address-increment to exceed one-sixth of a full-scale advance. To avoid this problem and produce acceptable address increments that satisfy accepted sampling theory and that are sufficiently small to permit satisfactory reproduction of selected waveforms stored in ROM 27, the ROM-address-increments corresponding to $d_x$ and $d_y$ are first applied to registers 20, 22 where they are divided by an integer (e.g., the integer eight) to produce the values ($d_x/8$) and ($d_y/8$). These values ($d_x/8$) and ($d_y/8$) are then applied to adders 21 and 23, respectively. During each increment period (e.g., 1 millisecond) that $d_x$ is applied to register 20, adder 21 adds ($d_x/8$) to the contents of register 24 eight times. The rate (8KHz) at which this adding operation is performed is indicated by clock 28. At the end of each subperiod (i.e., 1/8 millisecond), the contents (A) of accumulator register 24 is as follows:

| Elapsed time (Successive subperiods in milliseconds) | Register Contents (A) |
|---|---|
| .125 | $A_0 + \frac{d}{8} x$ |
| .25 | $A_0 + \frac{2d}{8} x$ |
| .375 | $A_0 + \frac{3d}{8} x$ |
| .5 | $A_0 + \frac{4d}{8} x$ |
| .625 | $A_0 + \frac{5d}{8} x$ |
| .75 | $A_0 + \frac{6d}{8} x$ |
| .875 | $A_0 + \frac{7d}{8} x$ |
| 1.0 | $A_0 + d_x$ | where, A represents the quantity $A_0 + kd_x/8$, $A_0$ represents an immediately previous content of register 24 or an initial address value (viz., the start-up contents of register 24 corresponding to an initial X-component position of plot-head 67), and $k$ represents the number of times, within a 1 ms period, that $d_x$ has been added to $A_0$. The quantity A from register 24 is then truncated to produce an integer address $N_x$ for accessing ROM 27. Similarly, in response to $d_y$ being applied to divider register 22, adder 23 and accumulator 26 operates in conjunction with register 22 to produce an integer address $N_y$ (equivalent to the integer portion of $A_0 + kd_y/8$) each ⅛ millisecond period. At the end of each subperiod (⅛ ms), the ROM addresses $N_x$ and $N_y$ are then applied to multiplexer 25 for accessing locations (words) in ROM 27 that have addresses $N_x$ and $N_y$, respectively. Each address N represents one of 128 ROM addresses. Thus, where, as here, accumulator registers 24, 26 are selected as 8-bit registers, overflow of these registers causes their contents to be treated modulo 128 which, in effect, produces 128 cyclical addresses (0 → 127 → 0).

The output of multiplexer 25 is applied to ROM 27 via 7-bit address input line 30. The 7-bit address input line corresponds to the seven least significant bits of accumulator registers 24, 26. The integer contents of these seven least significant bits (i.e., address N) are used to specify a ROM location (word) within each group. Thus, an address $N_x$ would be used to specify, to X-motor 55, a ROM word in the first group containing A-phase current information and also a ROM word in the second group containing B-phase current information.

During the first half of a control cycle (i.e., the cycle for producing an X-and a Y-axis phase current waveform sample, where the X-axis phase current waveform sample is represented by a first pair of A and B phase waveform samples defining a position along the X coordinate axis, and the Y-axis phase current waveform sample is represented by a second pair of A and B phase waveform samples defining a position along the Y coordinate axis), the contents of a ROM word from the first group is sampled and an analog equivalent of the sampled value is applied to sample and hold circuit 35. This operation is accomplished as follows: first, switch 41 is closed and switch 43 is opened, next, the A-phase third harmonic (stored in bits 9–16 of the ROM word having the address $N_x$) is accessed and applied to digital-to-analog converter 29. After the digital-to-analog converter 29 has had time to settle and to convert the applied digital sample to an analog waveform sample and apply said waveform sample to summing amplifier 31, switch 33 is closed long enough to load the third harmonic waveform sample into sample-and-hold circuit 35.

Next, the A-phase fundamental plus third harmonic (stored in bits 1–8 of the ROM word with address $N_x$) is accessed and applied to digital-to-analog converter 29. At this time, switch 33 is opened and switch 45 is closed. Once the digital-to-analog converter 29 has settled and has converted the applied digital sample to an analog waveform sample and applied said waveform sample to summing amplifier 31, the output of the summing amplifier 31 consists of a composite waveform sample representing the A-phase fundamental plus third harmonic and an adjusted amount of third harmonic as determined by potentiometer 37. (The adjustable third harmonic level added to the analog waveform sample through switch 41 is out of phase with that preloaded into the ROM 27 so that the resultant level is adjustable from negative to positive through zero.) After the composite A-phase waveform sample has settled, switch 47 is closed momentarily to set sample-and-hold circuit 49. The output of sample-and-hold circuit 49 is a stair-step approximation of a continuous current waveform which is applied, via phase current amplifier-converter 75, to the A-phase stator windings of the X axis motor 55. (Post-sample filtering may be used to smooth the stair-step approximation before driving motor 55.)

In a similar manner, a composite B-phase waveform sample is generated, by first accessing the B-phase third harmonic from ROM 27 and loading sample-and-hold circuit 35 with an analog equivalent of the sample. The B-phase fundamental plus third harmonic is then added to an adjusted third harmonic waveform sample to produce the composite B-phase waveform sample after which, switch 51 is closed momentarily to set sample-and-hold circuit 53. Actually, switches 33 and 41 are closed and switches 43 and 45 are opened in order to load circuit 35 with a B-phase third harmonic waveform sample (the sample being accessed from bits 9–16 of the ROM word in the second group having the address $N_x$), after which, the B-phase fundamental plus third harmonic is sampled from ROM 27 (i.e., accessed from bits 1–8 of the ROM word in the second group having the address $N_x$) and added to B-phase third harmonic by summing amplifier 31 to produce a composite B-phase waveform sample. This composite B-phase waveform sample is then loaded into sample-and-hold circuit 53, upon the opening of switch 33 and the closing of switches 45 and 51. The output of circuit 53 is a stair-step approximation of a continuous current waveform which is applied, via phase current amplifier-converter 77, to the B-phase stator windings of the X axis motor 55. The action to this point is completed in the first half of the control cycle.

During the second half of the cycle, a second pair of composite A-and B-phase waveform samples (representing the Y axis phase current waveform samples) are produced in the same manner as for the first pair, except that potentiometer 39 is used in conjunction with switch 43 to produce the second pair. (As indicated hereinbefore, potentiometer 37 is used in conjunction with switch 41 to produce the first pair.) This second pair of A-and B-phase waveform samples represents a composite of samples accessed from ROM 27 according to the Y-address value $N_4$ applied to ROM 27 by multiplexer 25. With switches 57 and 61 closed, the composite A-and B-phase waveform samples of the second pair are then applied to sample-and-hold circuits 59 and 63, respectively. Circuits 59 and 63, in turn, apply the waveform samples (in the form of stair-step approximations of continuous current waveforms), via phase current amplifier-converters 79, 81, to the A-and B-phase stator windings, respectively, of Y axis motor 65. After the A- and B-phase current samples are applied to Y axis motor 65, the control cycle is ended and another control cycle begins as the process is repeated. Successive pairs of A-and B-phase currents applied to the X-and Y-axis motors 55, 65 cause plot head 67 to move smoothly from position $(X_0, Y_0)$ to position $(X_1, Y_1)$.

Figure 6:
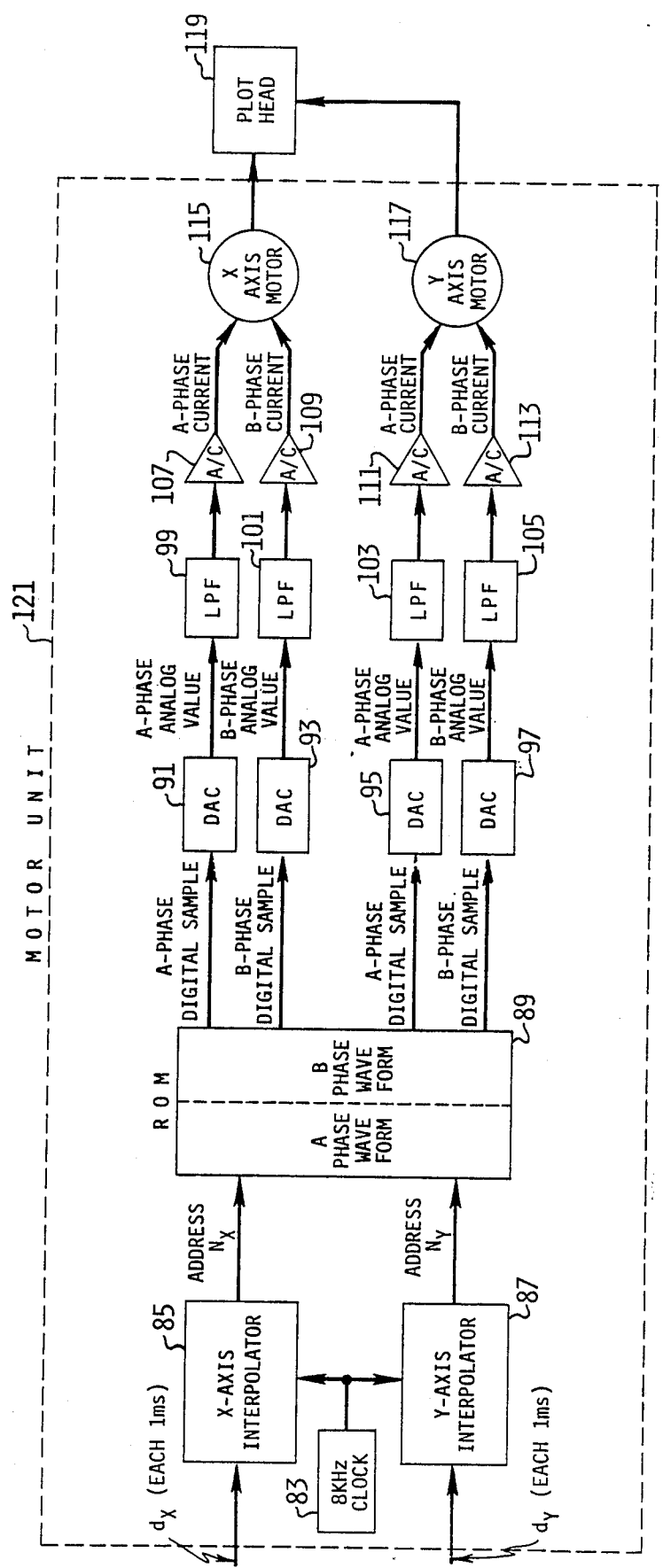
FIG. 6 is a block diagram of an alternative embodiment of the system of the present invention.

The outputs from sample-and-hold circuits 49, 53, 59 and 63 are applied to the inputs of phase current amplifier-converters 75, 77, 79 and 81, respectively. These amplifier-converter devices (which include controls for adjusting dc offset and phase current amplitude, and which may optionally include post-sample filtering to smooth the current waveforms as shown in FIG. 6) convert input voltage into a corresponding current in their phase windings.

From the foregoing, analysis of equations (13) and (14) shows that if either $I_A$ or $I_B$ contains a dc term, torque will be produced at the fundamental frequency, $\omega_0$. (Any residual dc magnetic fields retained in the motor ferromagnetic material that produce flux in the A-and B-phase windings will create this same effect.) This effect can be cancelled by adjusting the dc offset controls on the A-and B-phase current amplifier-converters for each motor.

The equations (25), (26), (27) and (28) describing the torque produced by the two phases, assume that (1) both phases have identical peak current amplitudes applied, and (2) the winding count is identical for the two phases. These assumptions permit substantially perfect cancellation of torque harmonics at $2\omega_0$, $6\omega_0$, $10\omega_0$, etc., as indicated by equation (41). The primary requirement leading to the cancellation of these harmonics is that the applied mmf in each phase is identical in magnitude and that the two phases are electrically and mechanically in quadrature. The quadrature requirement is met by the mechanical design of the motor and the bit patterns stored in the waveform ROM 27. The relative magnitudes of the A-and B-phase mmf can be equalized by adjusting the amplitude of the applied current to either phase. If deficiencies exist in the effective number of turns for either phase, the mmf can be corrected by applying a correspondingly larger current.

Three separate adjustments are thus provided for each motor: (1) dc offset, which affects torque at $\omega_0$ (2) relative gain between the phases, which affects torque harmonics at $2\omega_0$, $6\omega_0$, etc., and (3) third harmonic amplitude, which affects the torque harmonic at $4\omega_0$. These adjustments are made in sequence starting with the dc offset. First, the input current frequency, $\omega_0$, for one axis is adjusted so that it falls near the peak of the lowest frequency resonance of the rotor-load combination. The A-and B-phase offset currents are then iteratively adjusted to minimize resonant frequency vibrations sensed in the rotor's motion. Next the phase current frequency is halved so that the $2\omega_0$ torque harmonic falls on the resonance. The peak amplitude of one phase current is then adjusted relative to the other until a null is sensed in the rotor vibrations. Finally, the phase current frequency is halved again so that the $4\omega_0$ torque harmonic frequency falls near the resonant frequency. The amplitude of the third harmonic in the A-and B-phase waveforms is adjusted until a null is again sensed in the rotor vibrations.

If mechanical limits make it impractical to allow the motor to run long enough for the necessary adjustment to be accomplished, an alternative method may be used. This alternative method features an X-Y vector which is repetitively drawn back and forth along a single line. The line slope is then adjusted until the slow axis current frequency is at the desired value. The desired adjustment is then made.

FIG. 6 shows an alternative embodiment of the present invention which may be utilized to achieve smooth, continuous positioning of a device such as a plot head by applying sinusoidal phase currents to synchronous inductor motors connected to the device, harmonic torque perturbations of the motor not being a substantial problem. In the system of FIG. 6, the function generator or ROM 89 includes only the fundamental frequency waveform of the A- and B- phase currents to be supplied to the stator windings of motors 115, 117, and does not include third harmonic waveform data. Also, interpolators 85 and 87 each include a divider, an adder and an accumulator register (the multiplexer shown in FIG. 4 being omitted, since the outputs from the accumulator registers are applied directly to the ROM).

When X-position data, in the form of incremental distance value $d_x$, is applied to X-axis interpolator 85 of motor unit 121 for a selected time period such as 1 millisecond, interpolator 85 treats $d_x$ as a velocity value and produces therefrom a ROM address $N_x$. This ROM address is applied to ROM 89 where it is used to access a 16-bit ROM location having an 8-bit digital sample of the A-phase current waveform and an 8-bit sample of the B-phase current waveform. For example, the A-and B-phase waveform samples in the ROM may be stored in the following form (in degrees):

A-phase sample = 127 Sin (N/128× 360)

B-phase sample = 127 Cos (N/128× 360)

where, 127 represents a scale factor and N represents address $N_x$ (or $N_y$ ROM location with address $N_y$ is being accessed). The accessed A-and B-phase samples are then applied to digital-to-analog converters (DAC) 91 and 93 respectively, where they are converted to analog values (levels) and applied to low pass filters 99 and 101, respectively. Low pass filters 99 and 101 smooth the applied analog values and apply the smoothed analog values to phase current amplifiers (bipolar voltage-to-current converter-drivers) 107 and 109 respectively. Amplifier-converters 107 and 109 convert the applied analog values to A-phase and B-phase motor currents, respectively, and apply these currents to X axis motor 115.

In a similar manner, as shown in FIG. 6, when Y position (velocity) data $d_y$ is applied to Y-axis interpolator 87 of motor unit 121. A-and B-phase motor currents corresponding to the value of $d_y$ are applied to Y axis motor 117. Successive pairs of these A-and P-phase motor currents applied to the X and Y axis motors 115 and 117, cause plot head 119 to move smoothly from one position to the next, for example, from $(X_0, Y_0)$ to $(X_1, Y_1)$.

If torque perturbations are important but motor characteristics are sufficiently constant so that a fixed harmonic structure can be included in the phase current waveform to effect the necessary correction, this fixed-harmonic-structure phase current waveform can be stored in ROM 89 in place of the abovementioned sinusoids, in which event the operation of the system would be as described above, except that the phase currents now contain the harmonics necessary to achieve smooth performance.

We claim:

1. An electric drive comprising:
an inductor-type synchronous motor having a plurality of stators coupled to a plurality of stator windings each of which is capable of being excited by a complex waveform current having a fundamental frequency and a harmonic of the fundamental frequency, and having a magnetized moveable portion that is supported for movement relative to the stators and is capable of producing a force in a selected direction in response to a current in the stator windings, and generates periodic flux waveforms which include the fundamental frequency and harmonics of the fundamental frequency that heterodyne with the fundamental frequency in the current to produce a harmonic of the current fundamental frequency in the motor force; and
a plurality of phase current supplies each including:
an input connected to receive an applied source of power;
an output connected to one of said plurality of stator windings; and
means coupled to said input for producing the complex waveform current at the output, which current has the fundamental frequency and the harmonic of the fundamental frequency which harmonic is an adjacent harmonic to the harmonic in the motor force, such that the harmonic in the current heterodynes with the fundamental frequency in the periodic flux waveforms to generate beat frequencies in the motor's force which diminish the magnitude of the harmonic in the motor force that occurs as a result of the current fundamental frequency heterodyning with the periodic flux waveforms in the motor.

2. An electric drive comprising:

an inductor-type synchronous motor having a plurality of stators coupled to a plurality of stator windings each of which is capable of being excited by a complex waveform current having a fundamental frequency and a harmonic of the fundamental frequency, and having a magnetized rotor that rotates about an axis and is capable of producing torque in response to a current in the stator windings and generates periodic flux waveforms which include the fundamental frequency and harmonics of the fundamental frequency that heterodyne with the fundamental frequency in the current to produce a harmonic of the current fundamental frequency in the motor torque; and a plurality of phase current supplies each including:

an input connected to receive an applied source of power;

an output connected to one of said plurality of stator windings; and means coupled to said input for producing the complex waveform current at the output, which current has the fundamental frequency and the harmonic of the fundamental frequency which harmonic is an adjacent harmonic to the harmonic in the motor torque, such that the harmonic in the current heterodynes with the fundamental frequency in the periodic flux waveforms to generate beat frequencies in the motor's torque which diminish the magnitude of the harmonic in the motor torque that occurs as a result of the current fundamental frequency heterodyning with the periodic flux waveforms in the motor.

3. An electric drive as in claim 2 wherein said:

inductor-type synchronous motor includes eight stators disposed equidistant from the axis and spaced at equiangular intervals about the axis, with a first set of alternate angularly spaced stators having stator windings connected in a direct and quadrature axis configuration and capable of being excited by a first complex waveform current and a remaining set of alternate angularly spaced stators having stator-windings connected in a direct and quadrature axis configuration and capable of being excited by a second complex waveform current; and phase current supplies include a first phase current supply which generates the first complex waveform current and a second phase current supply which generates the second complex waveform current such that the second complex waveform current is similar in waveshape to the first complex waveform current displaced in phase by $\pi/2$ radians.

4. An electric drive as in claim 3 wherein said:

harmonic in the inductor-type synchronous motor torque is the fourth harmonic of the fundamental frequency in the complex waveform current; and said harmonic in the complex waveform current is the third harmonic of the fundamental frequency in the complex waveform current.

5. An electric drive as in claim 2 wherein said means includes:

an addressable digital memory means having a plurality of address inputs connected to receive an applied address signal as a memory location address for producing a plurality of outputs representative of a content of the addressed memory location;

said content of sequentially addressable memory locations of the addressable digital memory means having a sampled digital representation of said complex waveform current; and a digital-to-analog converter having a plurality of inputs connected to receive the outputs of the addressable digital memory means for producing an analog output representative of said complex waveform current.

6. An electric drive as in claim 5 wherein said:

means includes a digital accumulator having an input connected to receive a periodically applied signal which is added to a content of the accumulator and producing a plurality of outputs representative of the contents of the accumulator and connected to said plurality of address inputs for generating said applied address signal.

7. In an inductor-type synchronous motor having a magnetized moveable portion driven by an alternating signal having a fundamental frequency, a method of diminishing a harmonic sinusoidal perturbation in the force arising from the alternating signal heterodyning with sinusoidal flux waveforms, including the fundamental frequency and harmonics of the fundamental frequency, generated by the motion of the magnetized moveable portion, comprising the step of:

driving the inductor-type synchronous motor with a complex waveform current having the fundamental frequency and a harmonic of the fundamental frequency, which harmonic is an adjacent harmonic to the harmonic in the motor force, such that the harmonic in the current heterodynes with the fundamental frequency in the periodic flux waveforms to generate beat frequencies in the motor force which diminish the magnitude of the harmonic in the motor force.

8. In an inductor-type synchronous motor having a magnetized rotor driven by an alternating signal having a fundamental frequency, a method of diminishing a harmonic sinusoidal perturbation in the torque arising from the alternating signal heterodyning with sinusoidal flux waveforms, including the fundamental frequency and harmonics of the fundamental frequency, generated by the rotation of the magnetized rotor, comprising the step of:

driving the inductor-type synchronous motor with a complex waveform current having the fundamental frequency and a harmonic of the fundamental frequency, which harmonic is in adjacent harmonic to the harmonic in the motor torque, such that the harmonic in the current heterodynes with the fundamental frequency in the periodic flux waveforms to generate beat frequencies in the motor torque which diminish the magnitude of the harmonic in the motor torque.

9. In an inductor-type synchronous motor having a magnetized moveable portion driven by an alternating signal having a fundamental frequency, a method of diminishing force perturbations that occur in the motor at the fundamental frequency as a result of phase currents of the signal having a dc offset component, the method comprising the steps of:

adjusting the fundamental frequency to substantially coincide with the lowest resonant frequency of the moveable portions; and adjusting the dc offset component of the phase currents to minimize resonant frequency vibrations of the moveable portion.

10. In an inductor-type synchronous motor having a magnetized moveable portion driven by an alternating signal having a fundamental frequency and bipolar phase currents, a method of diminishing force perturbations that occur in the motor at selected harmonics of the fundamental frequency, the method comprising the steps of:

adjusting the phase currents until the lowest frequency harmonic substantially coincides with the lowest resonant frequency of the moveable portion; and adjusting the peak amplitude of the phase currents relative to each other until a null occurs in vibration of the moving portion.

11. In an inductor-type synchronous motor having a magnetized moveable portion driven by an alternating signal having a fundamental frequency and bipolar phase currents containing a third harmonic of the fundamental frequency, a method of diminishing force perturbations that occur in the motor at a fourth harmonic of the fundamental frequency, the method comprising the steps of:

adjusting the phase currents until the fourth harmonic substantially coincides with the resonant frequency of the motor; and adjusting the peak amplitude of the third harmonic inherent in the phase currents until a null occurs in motor vibration.

* * * * *